United States Patent [19]
Crisler et al.

[11] Patent Number: 5,481,537
[45] Date of Patent: Jan. 2, 1996

[54] TRANSMISSION SIGNALLING TECHNIQUE FOR A RESERVATION REQUEST

[76] Inventors: Kenneth J. Crisler, 2116 Kentucky Ct., Wheaton, Ill. 60187; Michael L. Needham, 354 W. Hellen Rd., Palatine, Ill. 60067

[21] Appl. No.: 221,138

[22] Filed: Mar. 31, 1994

[51] Int. Cl.⁶ .................................................. H04B 7/204
[52] U.S. Cl. ........................... 370/84; 370/95.1; 455/54.2
[58] Field of Search ............................ 370/17, 79, 85.6, 370/85.7, 85.8, 110.1, 119, 95.1, 95.2; 455/54.2, 58.1; 340/825.5, 825.08; 379/63; 371/69.1; 375/377

[56] References Cited

U.S. PATENT DOCUMENTS

| | | | |
|---|---|---|---|
| 4,987,571 | 1/1991 | Haymond et al. | 370/85.3 |
| 5,136,581 | 8/1992 | Muehrcke | 370/85.7 |
| 5,203,011 | 4/1993 | Bane et al. | 455/54.2 |
| 5,222,248 | 6/1993 | McDonald et al. | 455/54.2 |
| 5,257,402 | 10/1993 | Crisler et al. | 455/54.2 |
| 5,278,990 | 1/1994 | Heavel et al. | 455/54.1 |
| 5,343,473 | 8/1994 | Cidon et al. | 370/85.6 |
| 5,345,597 | 9/1994 | Strawczynski et al. | 455/54.2 |

*Primary Examiner*—Benedict V. Safourek
*Attorney, Agent, or Firm*—Susan L. Lukasik

[57] ABSTRACT

When data is ready for transmission, a quality measurement of a communication resource is determined (303). A preferred signalling technique is determined from a plurality of signalling techniques (305). A reservation request for allocation of the communication resource is transmitted, including in the reservation request the preferred signalling technique (307). A reservation grant is transmitted according to the preferred signalling technique (309).

15 Claims, 3 Drawing Sheets

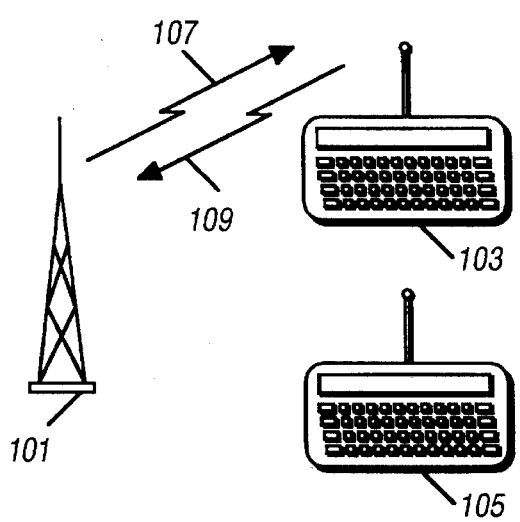
FIG. 1
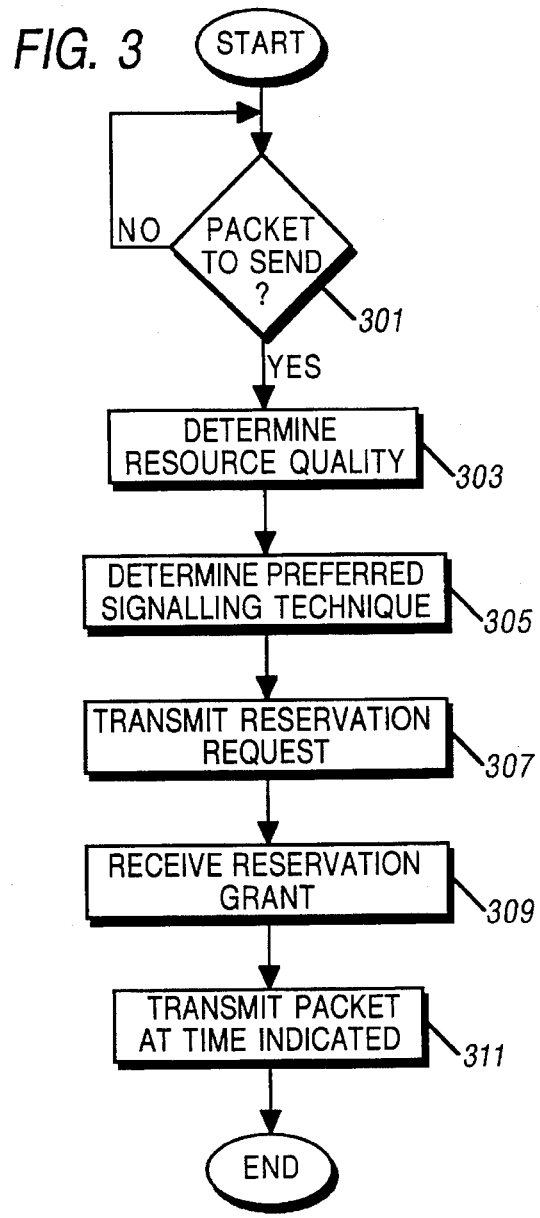
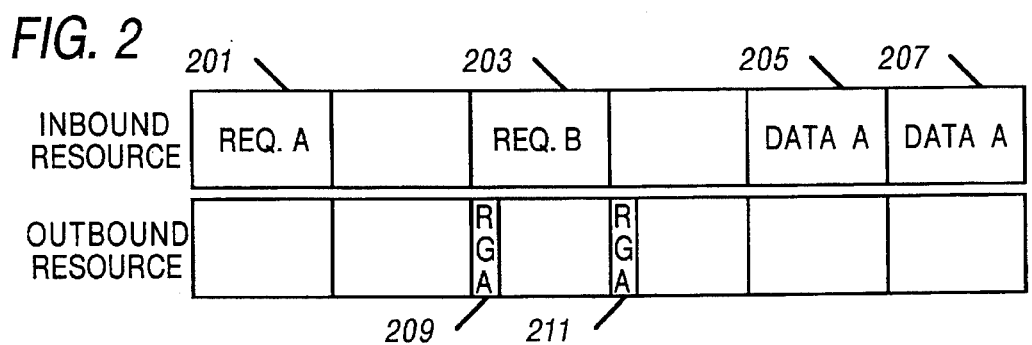

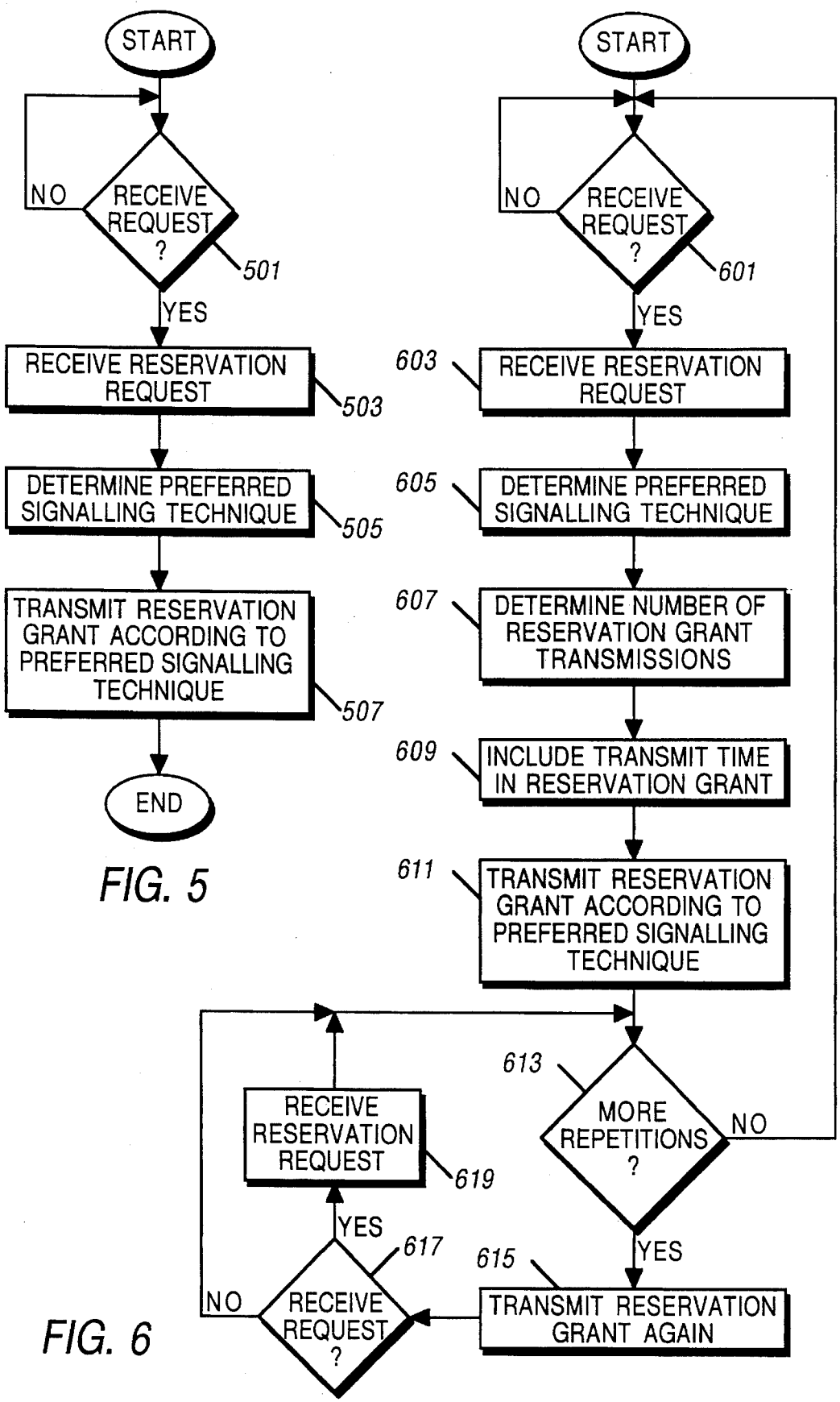

TRANSMISSION SIGNALLING TECHNIQUE FOR A RESERVATION REQUEST

FIELD OF THE INVENTION

This invention relates to transmission of data, including but not limited to requests and grants for communication resources on which data is to be transmitted.

BACKGROUND OF THE INVENTION

Communication systems on which data is transmitted are well known in the art. Before a user may transmit a data message, also known as a packet, many systems require a data (communication) unit to first request a communication resource, such as a frequency, frequency pair, TDM (time division multiplexed) time slot, and so forth. The system, by way of a controller, receives the request, also known as a reservation request, allocates a communication resource, and transmits a reservation grant, including information about the allocated communication resource. The allocation provides the user with the exclusive use of the assigned communication resource during an allotted time. Such methods can be very efficient, because the only portion of a data packet subject to collision, i.e., contention with other data units, on the channel is the reservation request, which is generally quite short.

Nevertheless, imperfect channel conditions found in a mobile radio data system can result in degradation of system performance. One such degradation of interest results from the data unit failing to recognize that a reservation grant has been transmitted to it. This failure may be caused by either poor signal-to-noise ratio, co-channel interference, or multipath fading. If the unit fails to recognize the reservation granted to it, the communication resource allocated for that reservation is essentially lost to the system, since all other data units are locked out of that channel for the duration of the reservation. This loss diminishes the access efficiency, thus reducing the overall channel capacity of the system.

While this situation could generally occur in any reservation-based data system, some systems permit a range of data rates to be used in an attempt to optimize throughput by matching the data rate to the current channel conditions. In other words, when a channel has good quality conditions, a higher data rate is used, and when channel conditions are poor, a lower data rate is transmitted. The lowest rate (offering the highest level of error protection) is very inefficient, although it has the highest likelihood of successful receipt. If the lowest data rate used at all times, transmission overall is inefficient in that a minimal amount of information is transmitted in the same time period. While use of a higher data rate for transmission is a more efficient use of channel space, such a data rate has the lowest probability of successful reception over all signal conditions, and consequently is not received with the greatest probability of successful decoding, resulting in retransmission of data messages. To solve the problem of high efficiency of channel versus high probability of receipt, many systems use a middle-of-the-road data rate, i.e., a rate in between the highest and lowest rates available in the system. Even with a medium date rate, data may not be transmitted reliably due to poor channel conditions, and the error rate of the reservation grant can be significant.

Time diversity is a well known method of improving communication reliability. With this method, information is simply repeated a number of times, thus increasing the probability that at least one repetition is received correctly. Such a solution could be applied to the reservation reliability problem by repeating the reservation grant a fixed number of times before actually beginning the reservation period. For use in good signal conditions, however, these repetitions would simply delay their use of the channel thus degrading the quality of service offered.

Accordingly, there is a need for an improved access method that is efficient in both time and communication resource usage.

BRIEF DESCRIPTION OF THE DRAWINGS

FIG. 1 is a block diagram of a communication system in accordance with the invention.

FIG. 2 is a timing diagram showing inbound and outbound information in accordance with the invention.

FIG. 3 is a flow chart showing determination of preferred signalling technique by a communication unit in accordance with the invention.

FIG. 5 is a flowchart showing a method used by a base station controller to handle the reservation requests and reservation grants in accordance with the invention.

FIG. 6 is a flowchart showing a method performed by a base station controller when the preferred signalling technique includes transmitting a number of repetitions of the reservation grant in accordance with the invention.

DESCRIPTION OF A PREFERRED EMBODIMENT

Figure 4:
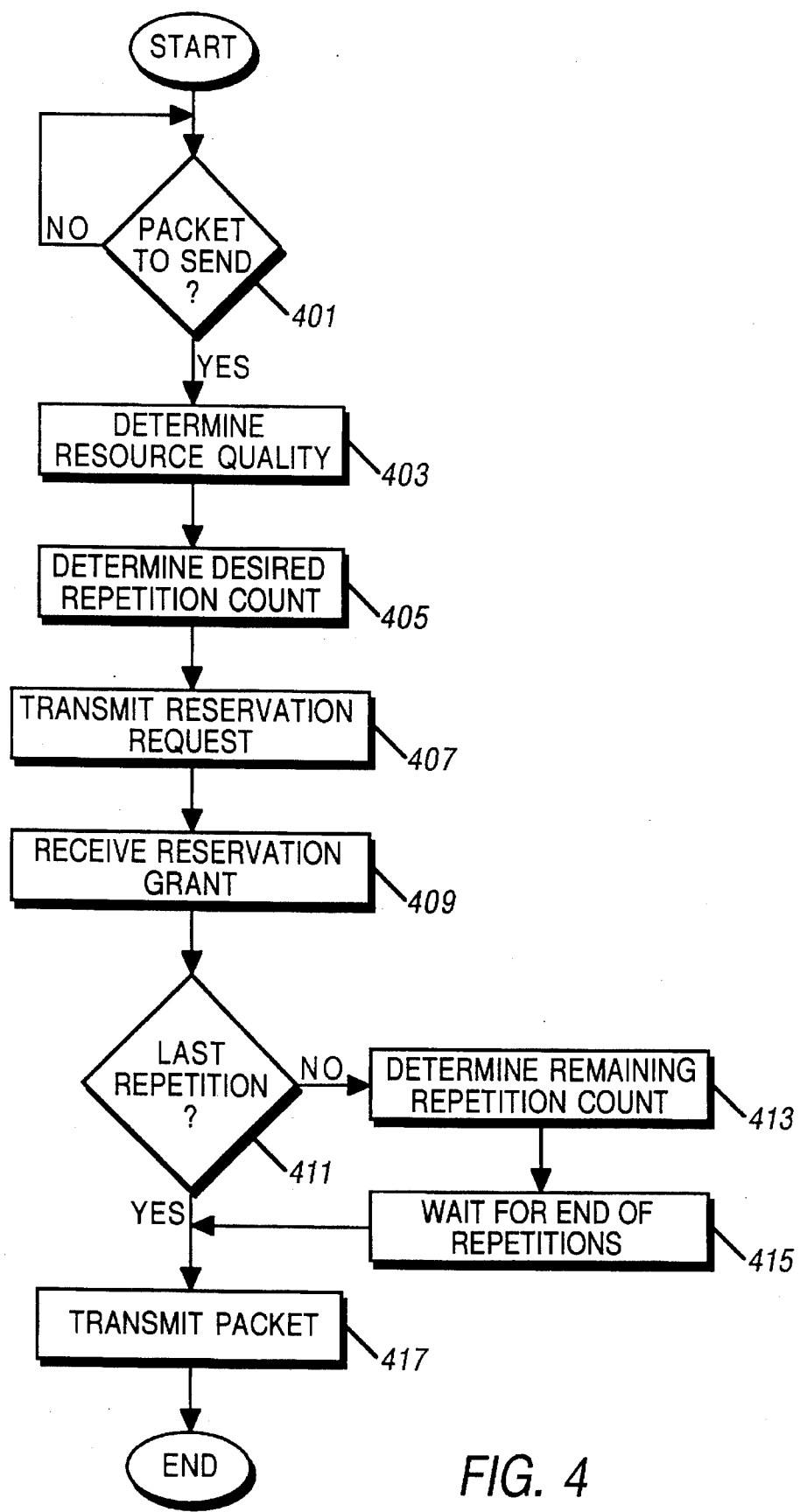
FIG. 4 is a flow chart showing determination of preferred signalling technique by a communication unit, where the preferred signalling technique involves requesting a particular number of transmissions of the reservation grant, in accordance with the invention.

The following describes an apparatus for and method of transmitting reservation grants for reservation requests in a data communication system. A communication unit determines a preferred signalling technique for a reservation grant to be transmitted by a base station controller. In one embodiment, the determination is based on a signal quality estimate of a communication resource. The preferred signalling technique may include requesting a particular number of transmissions of a reservation grant, such that the number of transmissions varies from grant to grant.

When data is ready for transmission, a quality measurement of a communication resource is determined. A preferred signalling technique is determined from a plurality of signalling techniques. A reservation request for allocation of the communication resource is transmitted, including in the reservation request an indication of the preferred signalling technique. In one embodiment, a reservation grant is transmitted according to the preferred signalling technique, the determination of the preferred signalling technique is based on the quality measurement, and the data is transmitted on the communication resource at a transmission time indicated in the reservation grant.

In one embodiment, the preferred signalling technique comprises requesting N transmissions of a reservation grant, where N is a positive integer, and the step of determining the preferred signalling technique further comprises the step of determining N from the quality measurement of the communication resource.

In another part of the invention, a reservation request for allocation of a communication resource is received. A preferred signalling technique is determined from the reservation request. A reservation grant is transmitted according to the preferred signalling technique. In one embodiment, the reservation grant is transmitted N times, where N is a positive integer. N may be established from information within the reservation request, and additional reservation requests may be received while the N reservation grants are transmitted. The reservation grant may comprise a transmission time indicating when allocation of the communication resource begins.

In one embodiment, a communication unit determines if data is ready for transmission. The communication unit determines a quality measurement of a communication resource. The communication unit determines a preferred signalling technique from a plurality of signalling techniques. The communication unit transmits a reservation request for allocation of the communication resource, including in the reservation request an indication of the preferred signalling technique. The reservation request is received at a controller. The controller determines from the reservation request the preferred signalling technique. The controller transmits a reservation grant transmitted according to the preferred signalling technique. The communication unit receives the reservation grant, if it is able. The preferred signalling technique may comprise requesting N transmissions of a reservation grant, where N is a positive integer, in which case the step of determining the preferred signalling technique further comprises the step of determining N from the quality measurement of the communication resource. The reservation grant may comprise a transmission time indicating when allocation of the communication resource begins, in which case the communication unit may transmit the data on the communication resource at the transmission time.

The block diagram of FIG. 1 shows a communication system in accordance with the invention. A base station controller 101, and two communication units 103 and 105 are shown. Inbound information 109 is transmitted from a communication unit 103 to the base station controller 101, and outbound information is transmitted from the base station controller 101 to the communication unit 103.

A timing diagram of inbound and outbound information is shown in FIG. 2. An inbound resource and an outbound resource are each divided into equal periods of time called slots. The resource may be a time division multiplexed (TDM) resource, inbound/outbound frequency pair, or other communication resources or channels as are known in the art. As shown in FIG. 2, the inbound resource, as shown in FIG. 1 as data transmission 109, includes information transmitted from communication units to base station controller 101. The inbound resource shows a request A from the communication unit 103 to the base station controller 101. This request, also known as a reservation request, is transmitted in a known time slot. The request includes how many time slots are necessary for the message which the communication unit 103 intends to transmit. For example, the communication unit may wish to transmit two slots worth of information, hence it will request two time slots in its reservation period. The base station controller 101 will process this request and transmit a reservation grant A (RGA) for the request A made by the communication unit 103. The request A also includes a preferred signalling technique which the base station controller 101 is to use to transmit the reservation grant back to the communication unit 103. In FIG. 2, that preferred signalling technique is to send two copies of the reservation grant and successive outbound slots. These reservations are shown in time slot 209 and slot 211 in the outbound resource timing diagram of FIG. 2. Reservation grant transmissions are transmitted in the first part of an outbound time slot, as shown in FIG. 2. During the time when an outbound resource transmits reservation grants, the corresponding inbound resource may also receive additional requests for channel allocations, as is shown by the request B being transmitted on the inbound resource as shown in time slot 203. In this way, although extra resources are being used to transmit a reservation grant, the inbound resource is not being wasted during this time period and more efficient usage of the channels is thereby obtained. The reservation grant may also indicate a time when the data is to be transmitted by the requester. The communication unit 103 then transmits the information in the two slots 205 and 207 as those slots were indicated to it for transmission in the reservation grant.

A flow chart showing determination of preferred signalling technique by a communication unit is shown in FIG. 3. Once there is a packet of data to be sent by communication unit 103 at step 301, the communication unit 103 determines the communication resource quality at step 303. This step may include any number of techniques as may be determined to be necessary for a particular system. Some resource quality determination techniques include received signal strength indication (RSSI), signal to interference ratio (C/I), signal to noise ratio (C/N), bit error rate (BER), cyclic redundancy check (CRC), or signal quality estimate algorithms, all of which are known in the art.

At step 305, the communication unit 103 determines the preferred signalling technique for the reservation grant that will be returned to the communication unit. This signalling technique may include different rates of speed for the transmission of the information, additional error correction techniques, or a particular number of transmissions of the reservation grant. At step 307, the communication unit 103 transmits the reservation request including an indication of the preferred signalling technique, to the base station controller 101. At step 309, the communication unit receives a reservation grant with respect to the reservation request transmitted in step 307. At step 311, the communication unit 103 transmits the packet or packets of data at any time that may be indicated in the reservation grant received in step 309.

The flow chart in FIG. 4 shows a particular embodiment of FIG. 3 in which the preferred signalling technique involves requesting a particular number of transmissions of the reservation grant. If there is a packet or packets of data to be sent at step 401, the communication unit determines the quality of the communication resource at step 403 as previously described in FIG. 3 for step 303. At step 405, the communication unit determines the desired repetition count, i.e., the number of times the communication unit desires the reservation grant to be transmitted to the unit. In particular, this repetition count may be determined by applying the quality of the communication channel in such a way that the unit can determine how many repetitions of the reservation grant will be necessary that it can be sure that it will receive at least one of the reservation grants acceptably. For example, suppose that reservation grant performance is determined to be acceptable when no more than 1% of reservation grants are not received by the communication units. Further suppose that a communication unit determines, based on the quality of the communication resource, that a 10% probability of not receiving a single reservation grant exists. Then, at least two (0.1×0.1=0.01) repetitions of the grant would be required to reach the predetermined acceptable performance level. In a similar fashion, each communication unit can determine a preferred number of reservation grant repetitions based on its individually unique determination of the communication resource quality.

At step 407, the communication unit 103 transmits the reservation request, which includes an indication that the preferred signalling technique is to have a number N repetitions of the reservation grant to be transmitted to it. At step 409, the communication unit receives the first reservation grant. In the preferred embodiment, each reservation grant typically contains an indication of the number of remaining repetitions. At step 411, if this is not the last repetition, i.e., the number of remaining repetitions is not zero, the process continues with step 413, in which the unit determines the remaining repetition count, i.e., how many repetitions are left to be received by the unit. At step 415, the unit waits for the end of the repetitions that were requested, and the process continues at step 417, where the communication unit 103 transmits the packet or packets of data that were intended for transmit at step 401. If at step 411 the last repetition was received, in step 409, then the communication unit 103 will transmit the data at step 417, and the process ends.

The flow chart of FIG. 5 shows a method used by a base station controller to handle the reservation requests and reservation grants. At step 501, if there is a reservation request received by the base station controller, the base station controller receives and decodes that reservation request at step 503. At step 505, the base station controller determines the preferred signalling technique from that reservation request. At step 507, the base station controller transmits a reservation grant in accordance with the preferred signalling technique determined in step 505, to the communication unit that transmitted the reservation request, and the process ends.

The flow chart of FIG. 6 shows a method performed by a base station controller when the preferred signalling technique includes transmitting a number of repetitions of the reservation grant. If there is an incoming reservation request at step 601, the reservation request is received and decoded at step 603. At step 605, the base station controller 101 determines the preferred signalling technique as indicated in the reservation request. At step 607, the base station controller 101 also determines the number of reservation grant transmissions that may be requested in the reservation request. At step 609, the base station controller includes a transmit time in the reservation grant at which time the requesting unit is to transmit its data. At step 611, the base station controller transmits the reservation grant according to the preferred signalling technique determined in step 605. If at step 613 more than one repetition of the reservation grant was requested, the process continues with step 615 where the reservation grant is transmitted again. At step 617, if there another reservation request incoming on the inbound channel, the base station controller will receive and decode that reservation request at step 619 and the process continues at step 613. In the preferred embodiment, the newly received reservation request is stored and processed after the end of the pending reservation. Such storing and processing techniques are well known in the art and are often referred to as queuing techniques. If at step 613, there are no more repetitions of the reservation grant to be transmitted, then the process continues with step 601.

The present invention includes a method of providing reserved access to a communication resource, such that each communication unit can experience both an acceptable level of access reliability and minimum access delay consistent with the desired level of access reliability. This goal is accomplished through the provision of multiple reservation grant signalling techniques and a method whereby each communication unit, when requesting reserved access, may indicate its preferred signalling technique. Many data communication systems operate in an environment (e.g., mobile radio) where the channel quality varies greatly from unit to unit. In contrast to a system offering only a single signalling technique (perhaps optimized for one nominal level of channel quality), the invention provides an improved quality of service, i.e., reduced access time, to units with better than nominal channel quality. The communication system as a whole is also enhanced in that the improved reliability of the reservation grants for units experiencing less than nominal channel quality leads to less waste of resources and therefore greater channel, i.e., communication resource, capacity.

What is claimed is:

1. A method comprising the steps of:
 when data is ready for transmission, determining a quality measurement of a communication resource;
 based on the quality measurement of the communication resource, determining a preferred signalling technique from a plurality of signalling techniques;
 transmitting a reservation request for allocation of the communication resource, including in the reservation request an indication of the preferred signalling technique; and
 receiving a reservation grant transmitted according to the preferred signalling technique.

2. The method of claim 1, wherein the preferred signalling technique includes different rates of speed for the transmission of the information, additional error correction techniques, and a particular number of transmissions of the reservation grant.

3. The method of claim 1, wherein the preferred signalling technique comprises requesting N transmissions of a reservation grant, where N is a positive integer.

4. The method of claim 3, wherein the step of determining the preferred signalling technique further comprises the step of determining N from the quality measurement of the communication resource.

5. The method of claim 1, further comprising the step of transmitting the data on the communication resource at a transmission time indicated in the reservation grant.

6. A method comprising the steps of:
 receiving a reservation request for allocation of a communication resource;
 determining from the reservation request a preferred signalling technique;
 transmitting a reservation grant according to the preferred signalling technique.

7. The method of claim 6, wherein the transmitting step further comprises transmitting the reservation grant N times, where N is a positive integer.

8. The method of claim 7, wherein N is established from information within the reservation request.

9. The method of claim 7, wherein additional reservation requests are received while the N reservation grants are transmitted.

10. The method of claim 6, wherein the reservation grant comprises a transmission time indicating when allocation of the communication resource begins.

11. A method comprising the steps of:
 determining, by a communication unit, if data is ready for transmission;
 determining, by the communication unit, a quality measurement of a communication resource;
 based on the quality measurement of the communication resource, determining, by the communication unit, a preferred signalling technique from a plurality of signalling techniques;
 transmitting, by the communication unit, a reservation request for allocation of the communication resource, including in the reservation request an indication of the preferred signalling technique;

receiving the reservation request at a controller;
at the controller, determining from the reservation request the preferred signalling technique; and
transmitting, by the controller, a reservation grant transmitted according to the preferred signalling technique.

12. The method of claim 11, further comprising the step of receiving, by the communication unit, the reservation grant.

13. The method of claim 11, wherein the preferred signalling technique comprises requesting N transmissions of a reservation grant, where N is a positive integer.

14. The method of claim 13, wherein the step of determining the preferred signalling technique further comprises the step of determining N from the quality measurement of the communication resource.

15. The method of claim 11, wherein the reservation grant comprises a transmission time indicating when allocation of the communication resource begins, further comprising the step of transmitting, by the communication unit, the data on the communication resource at the transmission time.

* * * * *

UNITED STATES PATENT AND TRADEMARK OFFICE
CERTIFICATE OF CORRECTION

PATENT NO. : 5,481,537
DATED : January 2, 1996
INVENTOR(S) : Kenneth J. Crisler; Michael L. Needham It is certified that error appears in the above-indentified patent and that said Letters Patent is hereby corrected as shown below:

Column 6,
In claim 1, line 14, the word "off" should be --of:--

Signed and Sealed this

Twenty-sixth Day of March, 1996

Attest:

BRUCE LEHMAN

*Attesting Officer*  *Commissioner of Patents and Trademarks*